(12) United States Patent
Kostic et al.

(10) Patent No.: US 9,042,350 B2
(45) Date of Patent: *May 26, 2015

(54) FIRMWARE PROCESSING FOR DOWNLINK F-DPCH

(71) Applicant: BROADCOM CORPORATION, Irvine, CA (US)

(72) Inventors: Zoran Kostic, Holmdel, NJ (US); Severine E. Catreux-Erceg, Cardiff by the Sea, CA (US); Li Fung Chang, Holmdel, NJ (US); Wei Luo, Marlboro, NJ (US); Hongwei Kong, Denville, NJ (US)

(73) Assignee: Broadcom Corporation, Irvine, CA (US)

( * ) Notice: Subject to any disclaimer, the term of this patent is extended or adjusted under 35 U.S.C. 154(b) by 191 days.

This patent is subject to a terminal disclaimer.

(21) Appl. No.: 13/873,514

(22) Filed: Apr. 30, 2013

(65) Prior Publication Data

US 2013/0242868 A1    Sep. 19, 2013

Related U.S. Application Data

(63) Continuation of application No. 11/963,457, filed on Dec. 21, 2007, now Pat. No. 8,437,315.

(60) Provisional application No. 60/953,461, filed on Aug. 1, 2007.

(51) Int. Cl.
| H04B 7/216 | (2006.01) |
| H04W 52/24 | (2009.01) |
| H04B 1/7115 | (2011.01) |
| H04W 52/54 | (2009.01) |

(52) U.S. Cl.
CPC .......... *H04W 52/241* (2013.01); *H04W 52/545* (2013.01); *H04B 1/7115* (2013.01)

(58) Field of Classification Search
None
See application file for complete search history.

(56) References Cited

U.S. PATENT DOCUMENTS

| RE44,858 E * | 4/2014 | Hosur et al. ................... 370/318 |
| 2002/0010001 A1* | 1/2002 | Dahlman et al. ............... 455/522 |
| 2003/0087620 A1* | 5/2003 | Sendonais ....................... 455/266 |
| 2003/0091103 A1* | 5/2003 | Sendonaris .................... 375/148 |
| 2004/0058700 A1* | 3/2004 | Nilsson et al. ................. 455/522 |
| 2004/0228305 A1* | 11/2004 | Grieco .......................... 370/335 |
| 2005/0249187 A1* | 11/2005 | Cho et al. ...................... 370/349 |
| 2006/0073823 A1* | 4/2006 | Kent et al. ..................... 455/423 |
| 2006/0246907 A1* | 11/2006 | Kaikkonen et al. ............ 455/442 |
| 2006/0262754 A1* | 11/2006 | Andersson et al. ............ 370/332 |

(Continued)

*Primary Examiner* — Ian N Moore
*Assistant Examiner* — Phong La
(74) *Attorney, Agent, or Firm* — Garlick & Markison; Kevin L. Smith

(57) ABSTRACT

A channel receiver operable to implement fractional dedicated physical channel (F-DPCH) for high-speed data packet access is provided. A received RF signal is processed to produce a set of soft symbol outputs. The receiver detects whether transmit power control (TPC) command bits are present in the set of soft symbol outputs. The TPC command bits are conveyed with the RF signal over non-dedicated pilot bits in the processed baseband signal. When TPC command bits are detected, the set of soft symbol outputs are processed to produce estimated TPC command bits. A TPC quality estimate is generated based on the estimated TPC command bits. A signal-to-interference ratio for the WCDMA dedicated physical channel is adjusted based upon a comparison of the TPC quality estimate with a TPC quality target to effect F-DPCH power control.

20 Claims, 10 Drawing Sheets

(56) References Cited

U.S. PATENT DOCUMENTS

| | | | |
|---|---|---|---|
| 2006/0262840 A1* | 11/2006 | Wang et al. | 375/221 |
| 2007/0002982 A1* | 1/2007 | Heikkila | 375/346 |
| 2007/0076785 A1* | 4/2007 | Reial et al. | 375/148 |
| 2007/0189365 A1* | 8/2007 | Olsson et al. | 375/148 |
| 2007/0189367 A1* | 8/2007 | Yeo et al. | 375/148 |
| 2007/0287382 A1* | 12/2007 | Catreux-Erceg et al. | 455/63.1 |
| 2009/0296798 A1* | 12/2009 | Banna et al. | 375/229 |
| 2010/0002596 A1* | 1/2010 | Wu | 370/252 |
| 2011/0003561 A1* | 1/2011 | Miao et al. | 455/69 |
| 2014/0192853 A1* | 7/2014 | Hsu et al. | 375/232 |

* cited by examiner

WCDMA receiver 500

F-DPCH processing 800

F-DPCH firmware processing block 710 combiner 904

Quality Target Control 1100

FIRMWARE PROCESSING FOR DOWNLINK F-DPCH

CROSS REFERENCE TO RELATED APPLICATIONS

The present U.S. Utility patent application claims priority pursuant to 35 U.S.C. §120, as a continuation, to the following U.S. Utility patent application which is hereby incorporated herein by reference in its entirety and made part of the present U.S. Utility patent application for all purposes:
1. U.S. Utility application Ser. No. 11/963,457, entitled "FIRMWARE PROCESSING FOR DOWNLINK F-DPCH," filed Dec. 21, 2007, now issued as U.S. Pat. No. 8,437,315, on May 7, 2013, which claims priority pursuant to 35 U.S.C. §119(e) to the following U.S. Provisional Patent Application which is hereby incorporated herein by reference in its entirety and made part of the present U.S. Utility Patent Application for all purposes:
  a. U.S. Provisional Application Ser. No. 60/953,461, entitled "FIRMWARE PROCESSING FOR DOWNLINK F-DPCH,", filed Aug. 1, 2007.

TECHNICAL FIELD

The present embodiments relate generally to cellular wireless communication systems, and more particularly to the downlink processing within a wireless terminal of a cellular wireless communication system that supports high speed data packet access (HSDPA).

BACKGROUND

Cellular wireless communication systems support wireless communication services in many populated areas of the world. While cellular wireless communication systems were initially constructed to service voice communications, they are now called upon to support data and video (multimedia) communications as well. The demand for video and data communication services has exploded with the acceptance and widespread use video capable wireless terminals and the Internet. Video and data communications have historically been serviced via wired connections; cellular wireless users now demand that their wireless units also support video and data communications. The demand for wireless communication system video and data communications will only increase with time. Thus, cellular wireless communication systems are currently being created/modified to service these burgeoning demands.

Cellular wireless networks include a "network infrastructure" that wirelessly communicates with wireless terminals within a respective service coverage area. The network infrastructure typically includes a plurality of base stations dispersed throughout the service coverage area, each of which supports wireless communications within a respective cell (or set of sectors). The base stations couple to controllers, with each controller serving a plurality of Node B's. Each controller couples to a mobile switching center (MSC). Each controller also typically directly or indirectly couples to the Internet. In the 3rd Generation Partnership Agreement (3GPP) these base stations may also be referred to as "Node B's" and the wireless terminals may be referred to as user equipment (UE).

In operation, each Node B communicates with a plurality of wireless UEs operating in its cell/sectors. A controller coupled to the Node B routes voice, video, data or multimedia communications between the MSC and a serving base station. The MSC then routes these communications to another MSC or to the PSTN. Typically, controllers route data communications between a servicing Node B and a packet data network that may include or couple to the Internet. Transmissions from base stations to wireless terminals are referred to as "forward link" or "downlink" transmissions while transmissions from wireless terminals, or user equipment, to base stations are referred to as "reverse link" or "uplink" transmissions. The volume of data transmitted on the forward link typically exceeds the volume of data transmitted on the reverse link. Such is the case because data users typically issue commands to request data from data sources, for example, web servers, and the web servers provide the data to the wireless terminals. The great number of wireless terminals communicating with a single Node B forces the need to divide the forward and reverse link transmission resources (depending on the specific wireless standards, the resources could be frequency band, time slot, orthogonal code, and transmit power) amongst the various wireless terminals.

Wireless links between base stations and their serviced wireless terminals typically operate according to one (or more) of a plurality of operating standards. These operating standards define the manner in which the wireless link may be allocated, setup, serviced and torn down. One popular cellular standard is the Global System for Mobile telecommunications (GSM) standard. The GSM standard, or simply GSM, is predominant in Europe and is in use around the globe. The GSM standard has evolved in part into the 3rd Generation Partnership Agreement (3GPP). 3GPP provides Technical Specifications and Technical Reports for a 3rd Generation Mobile System based on evolved GSM core networks and the radio access technologies that they support (that is, UMTS Terrestrial Radio Access (UTRA) both Frequency Division Duplex (FDD) and Time Division Duplex (TDD) modes). The scope also includes the maintenance and development of the Global System for Mobile communication (GSM) Technical Specifications and Technical Reports including evolved radio access technologies (for example, General Packet Radio Service (GPRS) and Enhanced Data rates for GSM Evolution (EDGE)). While GSM originally serviced only voice communications, it has been modified to also service data communications. General Packet Radio Service operations and the Enhanced Data rates for GSM (or Global) Evolution (EDGE) operations coexist with GSM by sharing the channel bandwidth, slot structure, and slot timing of the GSM standard. GPRS operations and EDGE operations may also serve as migration paths for other standards as well, for example, IS-136 and Pacific Digital Cellular (PDC).

Third generation (3G) cellular networks have been specifically designed to fulfill the future demands of the mobile Internet. As mobile Internet services grow in popularity and usage, factors such as cost efficient optimization of network capacity and quality of service (QoS) will become ever more essential to cellular operators. These factors may be achieved with careful network planning and operation, improvements in transmission methods, and advances in receiver techniques. To this end, carriers need technologies that will allow them to increase uplink and downlink throughput and, in turn, offer advanced QoS capabilities and speeds that rival those delivered by cable modem and/or DSL service providers. In this regard, networks based on Wideband CDMA (WCDMA) technology can make the delivery of data to end users a more feasible option for today's wireless carriers. WCDMA has evolved continuously towards higher data rates and towards packet-switched IP-based services.

GPRS and EDGE technologies may be utilized for enhancing the data throughput of present second generation (2G)

systems such as GSM. The GSM technology may support data rates of up to 14.4 kilobits per second (Kbps), while the GPRS technology may support data rates of up to 115 Kbps by allowing up to 8 data time slots per time division multiple access (TDMA) frame. The EDGE technology, a further enhancement to GPRS, may support data rates of up to 384 Kbps. The EDGE technology may utilizes 8 phase shift keying (8-PSK) modulation to provide higher data rates than those that may be achieved by GPRS technology. The GPRS and EDGE technologies may be referred to as "2.5G" technologies.

UMTS technology with theoretical data rates as high as 2 Mbps, is a 3G evolution of GSM, using Wideband CDMA technology. UMTS may achieve higher data rates than GSM/EDGE due to many enhancements, including higher transmission bandwidth, adaptive higher order modulation and interference averaging due to a unity frequency reuse factor.

High-Speed Downlink Packet Access (HSDPA) technology is an Internet protocol (IP) based service, oriented towards data communications, which adapts WCDMA to support data transfer rates in the order of 14 megabits per second (Mbit/s). Developed by the 3G Partnership Project (3GPP) group, the HSDPA technology achieves higher data rates through a plurality of methods. In order to avoid excessive interference, 3G WCDMA may require fast power control to maintain a constant error rate. The HSDPA technology changes this paradigm and, in addition to adapting transmission power, also change the coding and modulation rate to adapt to changing channel conditions. Other methods that may be used to improve the data throughput are fast packet scheduling and a fast retransmission of lost packets by using Hybrid Automatic Repeat Request techniques.

For the HSDPA application, downlink data can be transmitted on the HS-DSCH, therefore legacy WCDMA DPCH channel is not necessary. But on the uplink, user equipment (UE) may still use DPCH to communicate to the Node B (or serving node), so it still needs to be power controlled. This requires that on the downlink the Transmit Power Control (TPC) bits in the DPCCH need to be preserved. In light of this, the fractional DPCH (F-DPCH) is introduces where only TPC bits are transmitted in the downlink. An additional benefit of this is that multiple users can use the save orthogonal spreading code if they all use F-DPCH, as they can be time multiplexed.

Since for F-DPCH in the downlink, only TPC is transmitted and dedicated pilot bits are no longer present, numerous processing in the UE, such as Signal-to-Interference Ration (SIR) estimation, power control target setting, frame sync process need to be redesigned.

BRIEF DESCRIPTION OF THE DRAWINGS

For a more complete understanding of the present embodiments and the advantages thereof, reference is now made to the following description taken in conjunction with the accompanying drawings in which like reference numerals indicate like features and wherein.

DETAILED DESCRIPTION OF THE DRAWINGS

Embodiments herein provide a downlink channel receiver operable to implement fractional dedicated physical channel (F-DPCH) processing within a RAKE receiver structure. The downlink channel receiver includes a receiver, a baseband processing block, a WCDMA processing block, wherein F-DPCH processing is divided between a plurality of hardware processing blocks and a plurality of firmware (FW) processing blocks, and an automatic gain control (AGC) function block. The receiver is operable to convert a radio frequency (RF) signal to a baseband signal. The baseband processing block operable to processes and provides the baseband signal to the WCDMA processing block and the AGC function block. F-DPCH processing is divided between the plurality of hardware processing blocks and plurality of firmware (FW) processing blocks. The AGC function block produces an output that is operable to adjust a variable gain within the receiver.

The embodiments herein may be practiced in a variety of settings that utilize a wireless communication receiver. The specific embodiments described below pertain to communication channels associated with a 3rd Generation Partnership Project (3GPP) telecommunication technology and, in particular, HSDPA/HSUPA technology associated with WCDMA. However, the invention need not be limited to such applications and other embodiments of the invention may be implemented in other communications protocols and standards. Furthermore, the invention is not limited for use with WCDMA only and may be used in many other wireless technologies as well.

Figure 1:
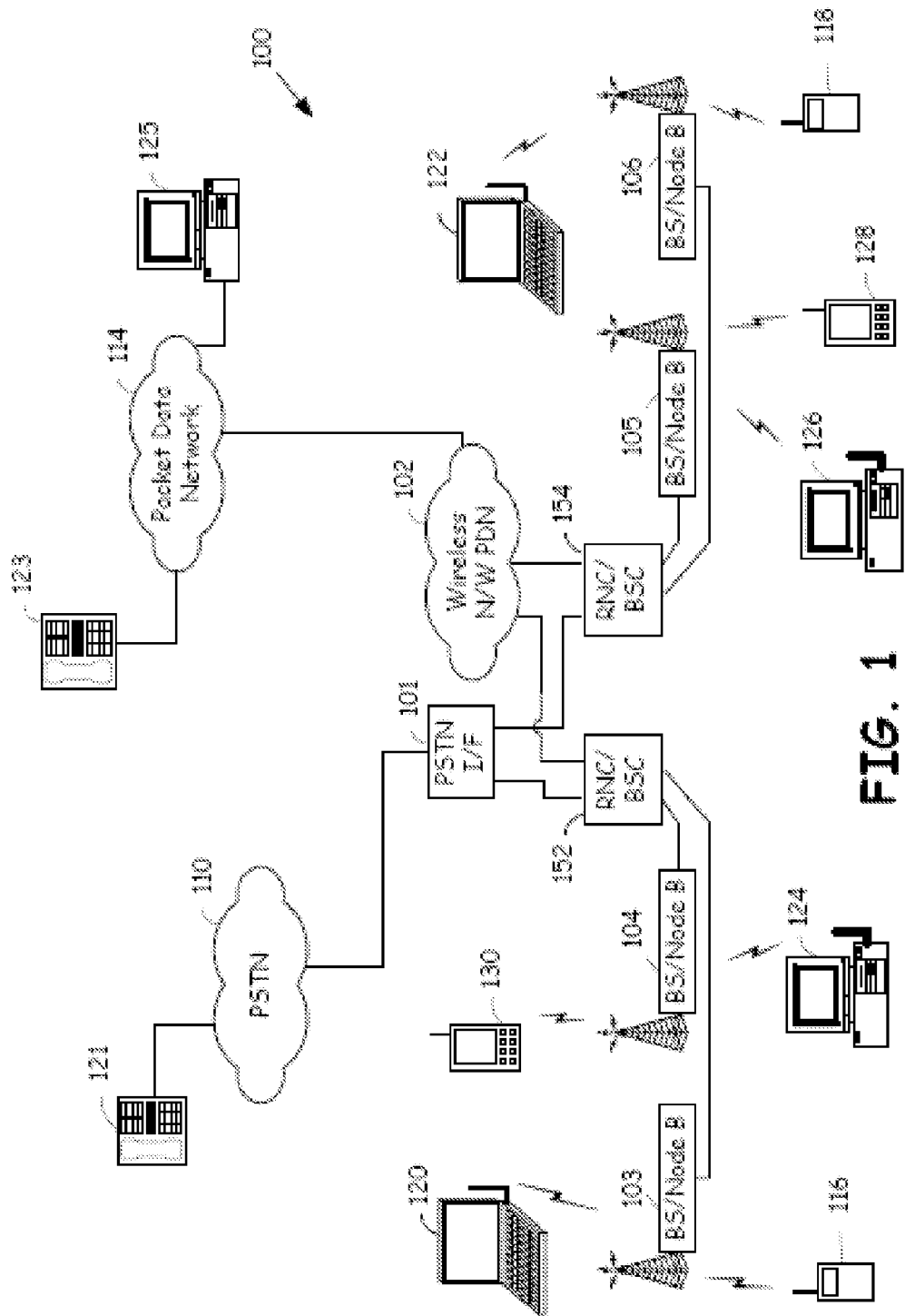
FIG. 1 is a system diagram illustrating a portion of a cellular wireless communication system that supports wireless terminals operating according to the practice of the present invention.

FIG. 1 is a system diagram illustrating a portion of a cellular wireless communication system 100 that supports wireless terminals operating according to the practice of the invention. The cellular wireless communication system 100 includes a Public Switched Telephone Network (PSTN) interface 101 (such as a Mobile Switching Center (MSC)), a wireless Packet Data Network (PDN) 102 (that may include GPRS Support Nodes, EDGE Support Nodes, WCDMA Support Nodes, and other components), Radio Network Controllers/Base Station Controllers (RNC/BSCs) 152 and 154, and base stations (BSs) 103, 104, 105, and 106, each of which are also referred to as Node B. The wireless network PDN 102 may be coupled to private and public packet data network 114, such as the Internet, WANs, LANs, etc. A conventional voice terminal 121 couples to a PSTN 110. A Voice over Internet Protocol (VoIP) terminal 123 and a personal computer (PC) 125 are shown coupled to the network 114. The PSTN Interface 101 may couple to a PSTN 110. Of course, this particular structure may vary from system to system and the particular system 100 is shown as an example only.

Each of the BS/Node Bs 103-106 services a cell or set of sectors within which it supports wireless communications. Wireless links that include both downlink components and uplink components support wireless communications between the base stations and their serviced wireless terminals. These wireless links support digital data communications, VoIP communications, and other digital multimedia communications. The cellular wireless communication system 100 may also be backward compatible in supporting analog operations as well. Cellular wireless communication system 100 supports one or more of the UMTS/WCDMA standards, the Global System for Mobile telecommunications (GSM) standards, the GSM General Packet Radio Service (GPRS) extension to GSM, the Enhanced Data rates for GSM (or Global) Evolution (EDGE) standards, and/or various other CDMA standards, TDMA standards and/or FDMA standards, etc. System 100 may also support one or more versions or "Releases" of the 3rd Generation Partnership Project (3GPP) telecommunication technology.

FIG. 1 also shows wireless terminals 116, 118, 120, 122, 124, 126, 128, and 130 coupled to cellular wireless communication system 100 via wireless links with base stations 103-106. As illustrated, wireless terminals may include cellular telephones 116 and 118, laptop computers 120 and 122, desktop computers 124 and 126, and data terminals 128 and 130. However, cellular wireless communication system 100 may support communications with other types of wireless terminals and devices as well. Devices such as laptop computers 120 and 122, desktop computers 124 and 126, data terminals 128 and 130, and cellular telephones 116 and 118, are typically enabled to "surf" the Internet, transmit and receive data communications such as email and text messaging, transmit and receive files, and to perform other data operations. Many of these data operations have significant download (downlink) data-rate requirements while the upload (uplink) data-rate requirements are not as severe. Some or all of wireless terminals 116-130 are therefore enabled to support the EDGE operating standard, the GPRS standard, the UMTS/WCDMA standards, the GSM standard and/or the 3GPP standard.

Figure 2:
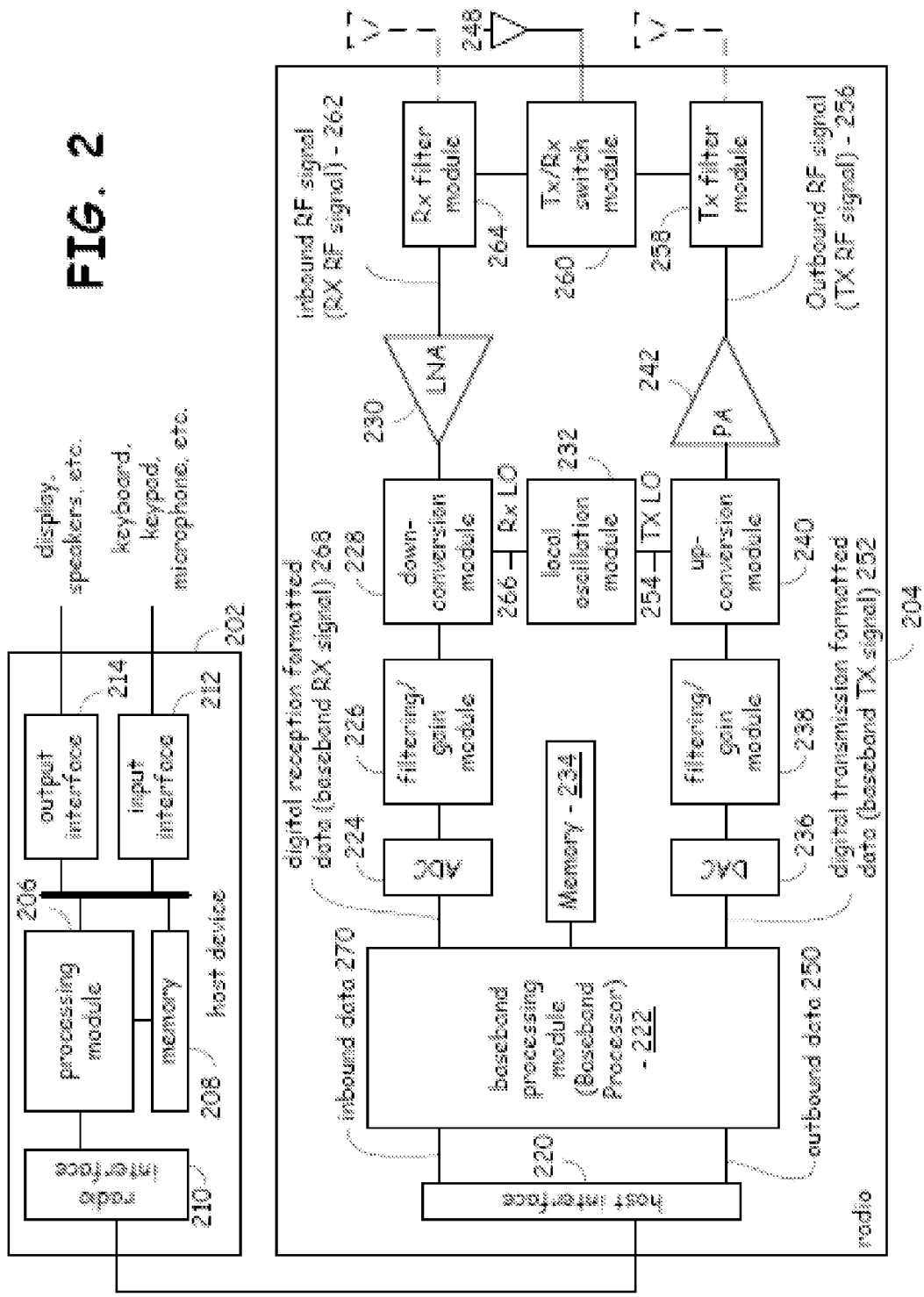
FIG. 2 is a block diagram functionally illustrating a wireless terminal or UE constructed according to embodiments of the present invention.

FIG. 2 is a schematic block diagram illustrating a wireless terminal that includes host processing components of a host device 202 and an associated radio 204. For cellular telephones, the host processing components of host device 202 and the radio are contained within a single housing. In some cellular telephones, the host processing components and some or all of the components of radio 204 are formed on a single Integrated Circuit (IC). For personal digital assistants hosts, laptop hosts, and/or personal computer hosts, radio 204 may reside within an expansion card and, therefore, reside separately from the host 202. The host processing components of host 202 may include a processing module 206, memory 208, radio interface 210, an input interface 212, and an output interface 214. Processing module 206 and memory 208 execute instructions to support host terminal functions. For example, for a cellular telephone host device, processing module 206 performs user interface operations and executes host software programs among other operations. Furthermore, as noted in FIG. 2, the host device may include or be coupled to one or more user interfaces (such as displays, speakers, headphones, keyboards, keypads, microphones, etc.).

Radio interface 210 allows data to be received from and sent to radio 204. For data received from radio 204 (for example, inbound data), radio interface 210 provides the data to processing module 206 for further processing and/or routing to output interface 214. Output interface 214 provides connectivity to one or more output display devices. Radio interface 210 also provides data from processing module 206 to radio 204. Processing module 206 may receive the outbound data from one or more input device via input interface 212 or generate the data itself. For data received via input interface 212, the processing module 206 may perform a corresponding host function on the data and/or route it to radio 204 via radio interface 210.

Radio 204 includes a host interface 220, baseband (BB) processing module 222 (baseband processor) 222, analog-to-digital converter (ADC) 224, filtering/gain module 226, down conversion module 228, low noise amplifier (LNA) 230, local oscillation module 232, memory 234, digital-to-analog converter (DAC) 236, filtering/gain module 238, up-conversion module 240, power amplifier (PA) 242, RX filter module 264, TX filter module 258, TX/RX switch module 260, and antenna 248. Antenna 248 may be a single antenna that is shared by transmit and receive paths or may include separate antennas for the transmit path and the receive path. The antenna implementation may depend on the particular standard to which the wireless communication device is compliant.

Baseband processing module 222 in combination with operational instructions stored in memory 234, execute digital receiver functions and digital transmitter functions. The digital receiver functions include, but are not limited to, digital intermediate frequency to baseband conversion, demodulation, constellation demapping, descrambling, and/or decoding. The digital transmitter functions include, but are not limited to, encoding, scrambling, constellation mapping, modulation, and/or digital baseband to IF conversion. The transmit and receive functions provided by baseband processing module 222 may be implemented using shared processing devices and/or individual processing devices. Processing devices may include microprocessors, micro-controllers, digital signal processors, microcomputers, central processing units, field programmable gate arrays, programmable logic devices, state machines, logic circuitry, analog circuitry, digital circuitry, and/or any device that manipulates signals (analog and/or digital) based on operational instructions. Memory 234 may be a single memory device or a plurality of memory devices. Such a memory device may be a read-only memory, random access memory, volatile memory, non-volatile memory, static memory, dynamic memory, flash memory, and/or any device that stores digital information. Note that when baseband processing module 222 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, radio 204 receives outbound data 250 from the host processing components via host interface 220. Host interface 220 routes outbound data 250 to baseband processing module 222, which processes outbound data 250 in accordance with a particular wireless communication standard (for example, UMTS/WCDMA, GSM, GPRS, EDGE, 3GPP, et cetera) to produce digital transmission formatted data 252. Digital transmission formatted data 252 is a digital baseband signal or a digital low IF signal.

Digital-to-analog converter 236 converts digital transmission formatted data 252 from the digital domain to the analog domain. Filtering/gain module 238 filters and/or adjusts the gain of the analog signal prior to providing it to up-conversion module 240. Up-conversion module 240 directly converts the analog baseband or low IF signal into an RF signal based on a transmitter local oscillation signal (TX LO) 254 provided by local oscillation module 232. Power amplifier 242 amplifies the RF signal to produce outbound RF signal 256, which is filtered by TX filter module 258. TX/RX switch module 260 receives the amplified and filtered RF signal from TX filter module 258 and provides output RF signal 256 signal to antenna 248, which transmits outbound RF signal 256 to a targeted device, such as to one of base stations 103-106 of FIG. 1.

Radio 204 also receives an inbound RF signal 262, which was transmitted by a base station via antenna 248, TX/RX switch module 260, and RX filter module 264. Low noise amplifier 230 receives inbound RF signal 262 and amplifies inbound RF signal 262 to produce an amplified inbound RF signal. Low noise amplifier 230 provides the amplified inbound RF signal to down conversion module 228, which converts the amplified inbound RF signal into an inbound low IF signal or baseband signal based on a receiver local oscillation signal (RX LO) 266 provided by local oscillation module 232. Down conversion module 228 provides the inbound low IF signal (or baseband signal) to filtering/gain module 226, which filters and/or adjusts the gain of the signal before providing it to analog to digital converter 224.

Analog-to-digital converter 224 converts the filtered inbound low IF signal (or baseband signal) from the analog domain to the digital domain to produce digital reception formatted data 268. Baseband processing module 222 demodulates, demaps, descrambles, and/or decodes the digital reception formatted data 268 to capture inbound data 270 in accordance with the particular wireless communication standard being implemented by radio 204. Host interface 220 provides inbound data 270 to the host processing components of host device 202 via radio interface 210.

Figure 3:
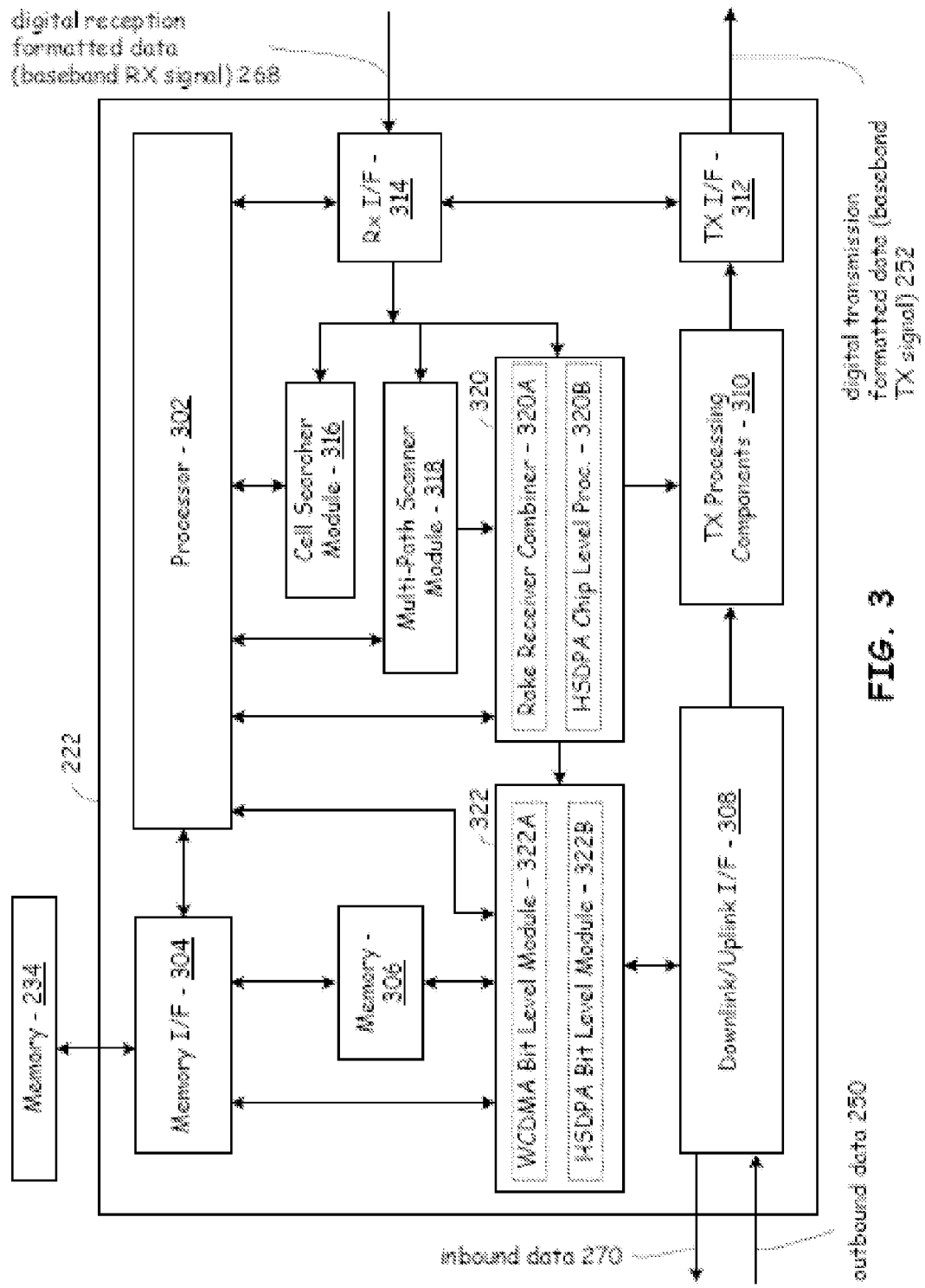
FIG. 3 is a block diagram illustrating in more detail the wireless terminal of FIG. 2, with particular emphasis on the baseband processing components of the wireless terminal.

FIG. 3 is a block diagram illustrating one embodiment for baseband processing module 222 of FIG. 2. Components of baseband processing module (baseband processor) 222 include a processor 302, a memory interface 304, onboard memory 306, a downlink/uplink interface 308, TX processing components 310, and a TX interface 312. Baseband processing module 222 further includes an RX interface 314, a cell searcher module 316, a multi-path scanner module 318, a chip level processing module 320, and a bit level processing module 322.

Chip level processing module 320 includes a RAKE receiver combiner 320A that generally supports WCDMA receive processing operations and a HSDPA chip level processing module 320B that generally supports HSDPA receive processing operations. Bit level processing module 322 includes a WCDMA bit-level processing module 322A that supports WCDMA bit-level operations and a HSDPA bit-level processing module 322B that supports HSDPA bit-level operations.

In some embodiments, baseband processing module 222 couples to external memory 234. However, in other embodiments, memory 306 may fulfill the memory requirements of baseband processing module 302. According to some aspects of the embodiment, memory 306 is cacheable while memory 234 is non-cacheable. Of course, in other embodiments, memory 234 may also be cacheable. As was previously described with reference to FIG. 2, baseband processing module 222 receives outbound data 250 from coupled host processing components 202 and provides inbound data 270 to the coupled host processing components 202. Further, baseband processing module 222 provides digital formatted transmission data (baseband TX signal) 252 to a coupled RF front end. Baseband processing module 222 receives digital reception formatted data (baseband RX signal) 268 from the coupled RF front end. As was previously described with reference to FIG. 2, an ADC 222 produces the digital reception formatted data (baseband RX data) 268 while DAC 236 of the RF front end receives the digital transmission formatted data (baseband TX signal) 252 from baseband processing module 222.

According to one particular embodiment, the downlink/uplink interface 308 is operable to receive the outbound data 250 from coupled host processing components, for example, the host processing component 202 via host interface 220. Further, the downlink/uplink interface 308 is operable to provide inbound data 270 to the coupled host processing components 202 via host interface 220. Baseband processing module 222 may be formed on a single integrated circuit with the other components of radio 204. Further, the radio 204 may be formed in a single integrated circuit along with the host processing components 202. Thus, in such case, all components of FIG. 2 excluding the antenna, display, speakers, et cetera and keyboard, keypad, microphone, et cetera may be formed on a single integrated circuit. However, in still other embodiments, baseband processing module 222 and the host processing components 202 may be formed on a separate integrated circuit. Many differing integrated circuit constructs are possible without departing from the teachings of the present embodiment.

TX processing components 310 and TX interface 312 couple to the RF front end as illustrated in FIG. 2 and to downlink/uplink interface 308. TX processing components 310 and TX interface 312 are operable to receive the outbound data from downlink/uplink interface 304, to process the outbound data to produce baseband TX signal 252 and to output baseband TX signal 252 to the RF front end as was described with reference to FIG. 2.

RX processing components, including cell searcher module 316, multi-path scanner module 318, chip level processing module 320, and in some cases processor 302, are operable to receive the RX baseband signal 268 from the RF front end as processed by RX I/F 314. Generally, RX I/F 314 produces soft symbols representing the digital reception formatted data 268 in a format suitable for use by these components. HSDPA chip level processing module 320B is operable to produce soft symbols output for use by processing module 322 for further processing, such as turbo coding.

Figure 4:
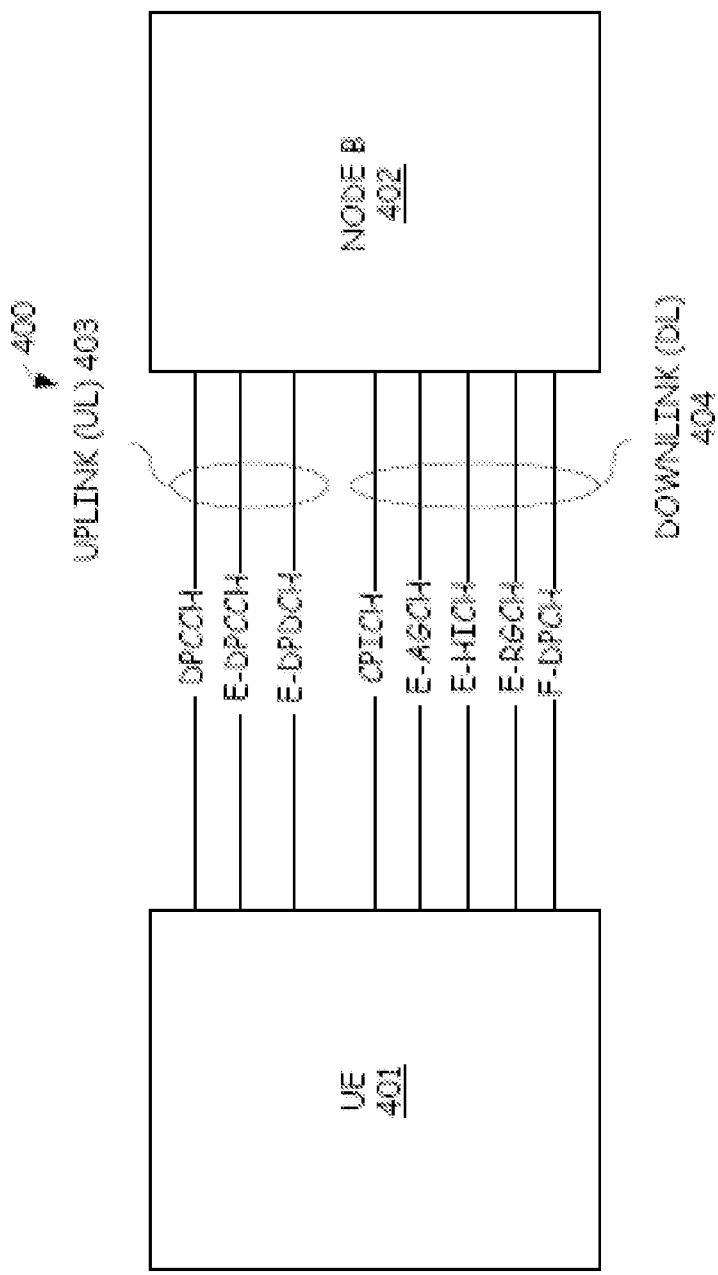
FIG. 4 shows a diagram of a radio link between a User Equipment (UE) and Node in accordance with embodiments of the present invention.

FIG. 4 shows a diagram of a radio link 400 between a User Equipment (UE) 401 and Node B 402. UE 401 may be one of a variety of downlink devices used for wireless communications. UE 401 may be one of the wireless terminals noted in FIG. 1. Node B 402 may be one of a variety of uplink devices used for wireless communications. Node B 402 may be one of the BS/Node Bs noted in FIG. 1. UE 401 and/or Node B may implement part of or all of the components, modules, devices, circuits noted in FIG. 2 and/or FIG. 3.

UE 401 and Node B 402 may communicate using one or more communication protocols or standards, in which communication is achieved by establishing a downlink (DL) and/or uplink (UL) channel(s) for control signal and data transfer, including the use of HSDPA/HSUPA technology. Although various communication standards and protocols may be used, the particular radio link 400 is shown employing a 3GPP standard. In particular, one of the Releases of 3GPP defines a set of dedicated channels. Release 6 of 3GPP, for example, identifies an Enhanced Dedicated Channels (E-DCH). Two uplink E-DCH channels 403 are identified as E-DCH Dedicated Physical Control Channel (E-DPCCH) and E-DCH Dedicated Physical Data Channel (E-DPDCH).

Four downlink E-DCH channels 404 are identified as E-DCH Absolute Grant Channel (E-AGCH), E-DCH Relative Grant Channel (E-RGCH), E-DCH Hybrid ARQ Indicator Channel (E-HICH), where ARQ stands for Automatic Repeat-reQuest. Another addition of Release 6 is the Fractional Dedicated Physical Channel (F-DPCH) for HSDPA application.

Uplink DPCCH is used to carry control information generated at Layer 1 and includes known pilot bits to support channel estimation, transmit power control (TPC) commands, feedback information (FBI) and an optional transport-format combination indicator (TFCI). E-DPDCH is used to carry the E-DCH transport channel (for example, data). There may be zero, one or several uplink DPDCH on each radio link. E-DPCCH carries the Layer 1 control information for E-DPCCH, such as the transport format information.

F-DPCH is a fixed rate dedicated downlink physical channel carrying the TPC bits for the uplink. There are no other fields occupied in the downlink F-DPCH slot for this user except for the TPC bits. There are two TPC bits per slot (00 or 11) mapped to one Quadrature Phase Shift Keying (QPSK) symbol. The QPSK symbol occupies one-tenth of the slot interval (256 chips). The spreading factor is 256. When Space-Time Transmit Diversity (STTD) is used, the same QPSK symbol is sent from both transmit antennas (that is, no STTD encoding is applied).

One other channel noted in FIG. 4 is a common downlink channel referred to as a Common Pilot Channel (CPICH), which is a fixed rate physical channel that carries a predefined bit sequence. When transmit diversity is used on any downlink channel in a cell, CPICH is transmitted from both antennas using the same channelization and scrambling code. However, the pre-defined bit sequence of the CPICH is different for antenna 1 and antenna 2.

In operation, Node B 402 generally controls the transmitted power of UE 401 by transferring commands through F-DPCH. UE 401 estimate the TPC error rates and the SIR on F-DPCH from the F-DPCH and runs power control, frame synchronization etc on F-DPCH. Soft handover can be done on F-DPCH similar to the normal DPCH. However, power control is done on the HSDPA serving cell link only.

A single processing device or a plurality of processing devices operably coupled to memory performs the processing duties. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on operational instructions. The memory may be a single memory device or a plurality of memory devices. Such a memory device may be a read-only memory, random access memory, volatile memory, non-volatile memory, static memory, dynamic memory, flash memory, cache memory, and/or any device that stores digital information. Note that when the processing duties are implemented via a state machine, analog circuitry, digital circuitry, and/or logic circuitry, the memory storing the corresponding operational instructions may be embedded within, or external to, the circuitry comprising the state machine, analog circuitry, digital circuitry, and/or logic circuitry. The processing duties include the execution of operational instructions corresponding to at least some of the steps and/or functions described above.

Figure 5:
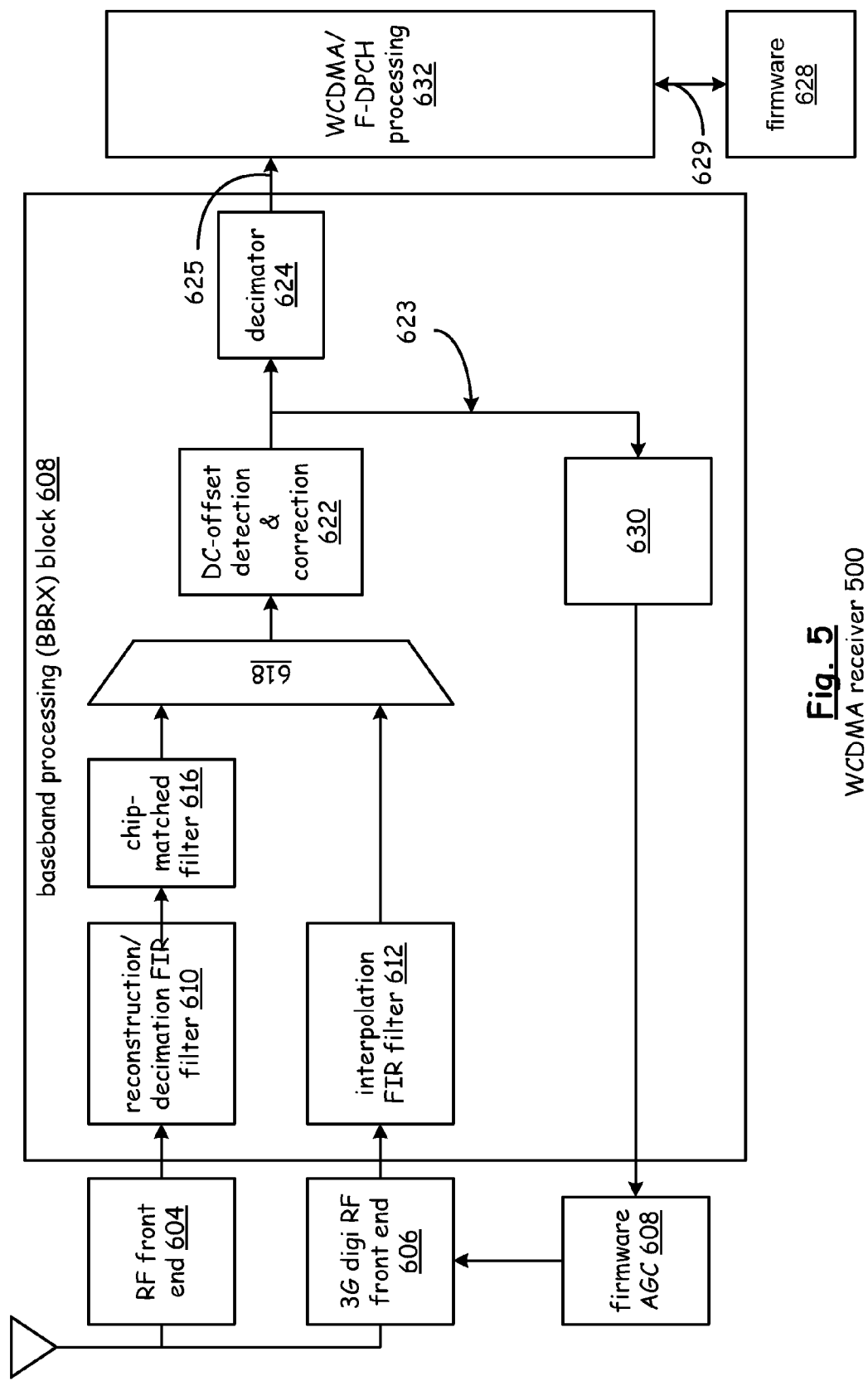
FIG. 5 provides a diagram of a top-level block diagram of such a WCDMA receiver in accordance with embodiments of the present invention.

FIG. 5 provides a diagram of a top-level block diagram of a WCDMA receiver 500 in accordance with embodiments herein. F-DPCH processing may be based upon a RAKE receiver structure and is implemented as part of the WCDMA receiver. FIG. 5 shows the data path leading to the WCDMA processing block. The WCDMA block is configured by and later on interacts with the firmware (FW) block 628 to exchange data and control information 629. In FIG. 5, the receiver uses either the Δ-Σ modulator 604 or the 3G Digi RF block 606 to convert the RF signal 602 to baseband. The output of the Δ-Σ modulator block 604 is a N-level (that is, N-level I and N-level Q, for example, N=5) C×M sampled complex signal, while the 3G Digi RF block 606 output is a multi-bit (that is, 8-bit I and 8-bit Q) C×2 (7.68 MHz) sampled complex signal. These signals are the inputs to the baseband processing (BBRX) block 608 of the WCDMA processor.

In BBRX block 608, the input from the Δ-Σ modulator 604 is down-sampled via a reconstruction/decimation FIR filter 610. On the other hand, the output from the 3G Digi RF block 606 may be up-sampled via an interpolation FIR filter 612 to reach the equivalent format. Only one source is used (Δ-Σ modulator block 604 or 3G Digi RF block 606), based on firmware configuration. If 3G Digi RF block 606 output is used, then the chip-matched filter (CMF) 616 inside the BBRX 608 can be bypassed by multiplexors 614 and 618 when a chip-matched filter inside the 3G Digi RF block 606 is used. The sampled signal is then up-sampled via an interpolation FIR filter 612 to reach a desired signal. A DC-offset detection and correction block 622 removes a residue DC component from the resulting signal. This signal is down-sampled by decimators 624 and 626 and passed to the WCDMA processing block 632. One signal is used by the searcher while the second is used by the RAKE receiver structure.

The DC-offset sampled data 623, on a separate path, is down-sampled and then used to measure the Received Signal Strength Indicator (RSSI) of the received signal at block 630 to assist the AGC function 608 of the firmware block 628 to adjust the variable gain amplifier inside the analog front-end block 604 or the 3G Digi RF block 606.

Figure 6:
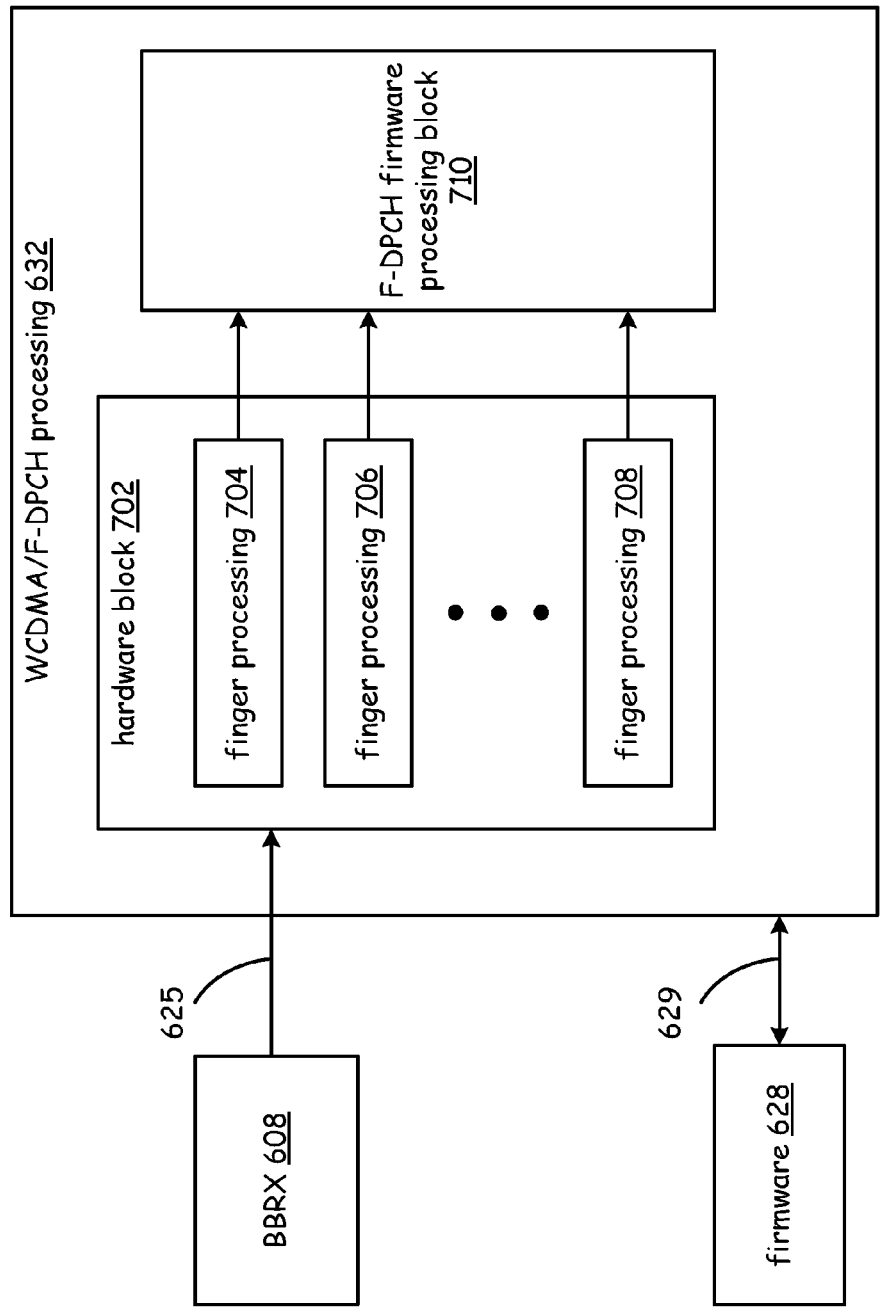
FIG. 6 provides the data/control path between major processing functions inside the F-DPCH processing block in accordance with embodiments of the present invention.

FIG. 6 provides the data/control path between major processing functions inside the F-DPCH processing block (WCDMA processing block) 632 in accordance with embodiments herein. As shown, BBRX 608 provides an output 625 to WCDMA/F-DPCH processing block 632 that includes a hardware block 702 with multiple finger processing blocks 704, 706 and 708. Firmware 628 provides F-DPCH related control parameters 629 to the WCDMA/F-DPCH processing 632. Soft symbol output for the individual fingers 704, 706 and 708 are produced and provided to F-DPCH firmware processing block 710. The hardware blocks for F-DPCH reuse that for the processing for DPCCH when the DPCH is configured, with modification on the STTD processing. Firmware processing block 710 is modified for DPCCH TPC processing based on updated F-DPCH requirements. As indicated in FIG. 6, F-DPCH downlink channel processing does not require the use of delay-matched data as TPC processing need to meet the critical round-trip latency requirements. The interface to the firmware may be double buffered, and the configuration/reconfiguration time should be at the beginning of a corresponding F-DPCH frame boundary of the target F-DPCH channel. Other interfaces and hardware circuitry may be added later to assist firmware 710 in making F-DPCH related decisions. These other hardware and interfaces may be introduced in order to alleviate the processing load on firmware, or based on changes of F-DPCH processing requirements, etc.

Figure 7:
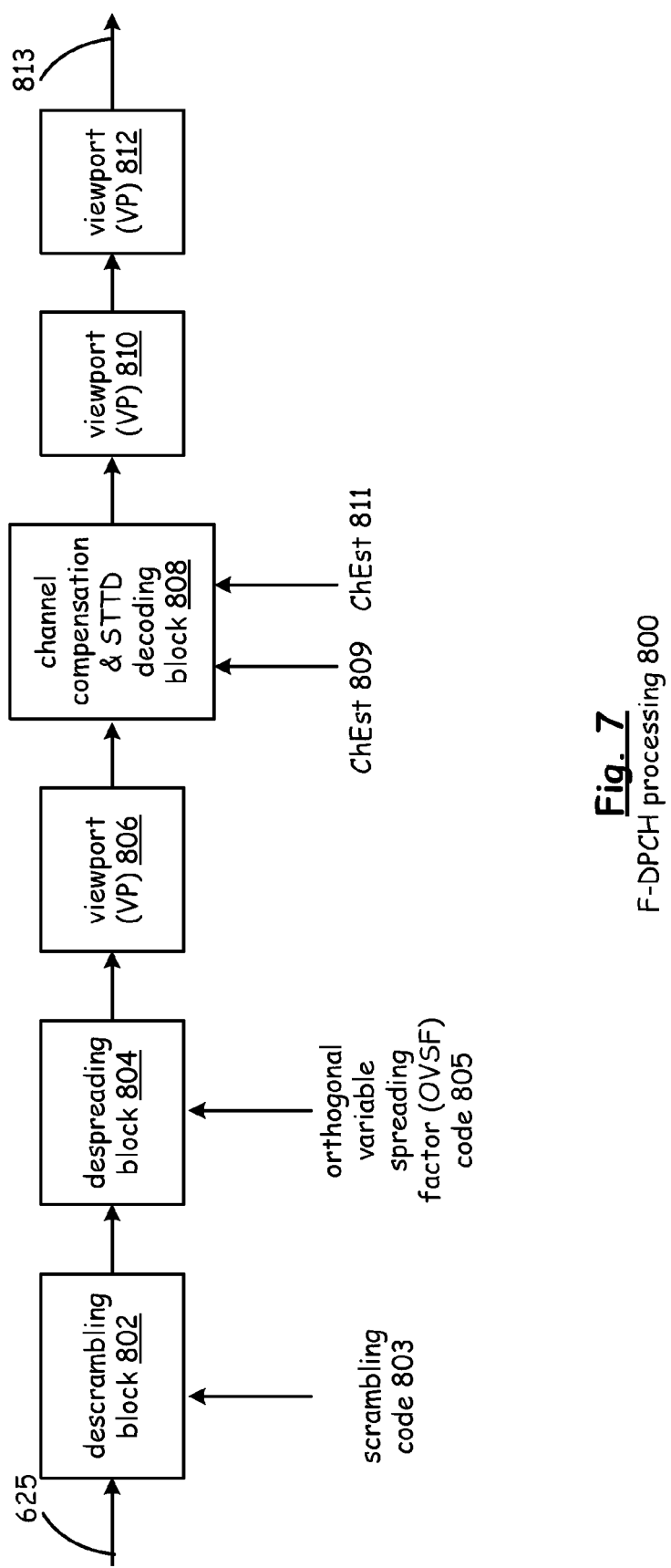
FIG. 7 provides a block diagram of the F-DPCH processing in accordance with embodiments of the present invention.

FIG. 7 depicts a block diagram of the F-DPCH processing 800. Starting from the input of the F-DPCH processing from the left-most side in FIG. 7, the finger processing block takes the chip-level input from the down-sampling data 625 from decimator 624 (see FIG. 5) and de-scrambles the data with descrambling block 802 based on scrambling code 803. For a Common Pilot Channel (CPICH), the descrambled data will be used for channel estimation (from the reference CPICH, not shown in this figure) and for F-DPCH demodulation. For F-DPCH demodulation, the descrambled data is despread based on the orthogonal variable spreading factor (OVSF) code 805 for the F-DPCH within despreading block 804. To complete this function the block uses an OVSF index and an OVSF code phase, which are aligned with the slot boundary. The OVSF index can be used to look-up the actual OVSF code, knowing for example that in one embodiment that the spreading factor for the F-DPCH is 256. The output of the F-DPCH despreading block is 256-chip rate.

The despread F-DPCH symbol is quantized by viewport (VP) 806 and then passed to the channel compensation and STTD decoding block 808. In block 808 the F-DPCH bits are not STTD encoded in the transmit diversity mode but transmitted the same way from the two transmit antennas. The channel estimates are read in at the same 256-chip rate as the F-DPCH symbol rate. Two channel estimates 809 and 811 corresponding to the same F-DPCH symbol are summed first then used as a single channel estimate to de-rotate the despread F-DPCH symbol. "STTD decoding" (that is, the summing of the two channel estimates from the two antennas, not the conventional STTD decoding) is activated when the F-DPCH transmit diversity indicator for this finger of FIG. 7 indicates so. When there is no transmit diversity, the channel estimate 811 from the second transmit antenna should be set to zero. The output of the Channel Compensation and STTD Decoding block 808 is first clipped by a fixed viewport 810, and then further quantized by viewport 812. The quantized output 813 is provided to the firmware 710 (see FIG. 6) via interrupt. There should be only one interrupt for all fingers 704, 06 and 708.

At F-DPCH initialization and F-DPCH reconfiguration, storage units (for example, those for the despreading operation) should be cleared. F-DPCH initialization and F-DPCH reconfiguration happens at a F-DPCH frame boundary. F-DPCH parameters 629 reconfiguration includes the change of the following parameters:

F-DPVH OVSF code
F-DPCH Transmit Diversity Mode (TxD to No TxD, or vice versa)
F-DPCH phase reference
F-DPCH frame offset For the first two parameters, the reconfiguration process is straightforward, the firmware loads the new F-DPCH parameters before the designated F-DPCH frame boundary into hardware, and hardware executes the change at the designated frame boundary. The third parameter is transparent to F-DPCH processing path. For the F-DPCH frame offset reconfiguration, since the gap between two TPC symbols in two adjacent is quite large, the adjustment will not result in any signal loss. Where the F-DPCH from the non-reference cell 1 has a timing drift relative to the reference cell (lagging) and is advanced by 256-chip when the F-DPCH is drifted outside the UE combining window. Drifting in the other direction has similar effect. From hardware point of view, the operation is similar to other parameter reconfigurations discussed in this section, that is, the firmware load the change before the designated frame boundary for the reconfiguration, and hardware executes it at the frame boundary.

Figure 8:
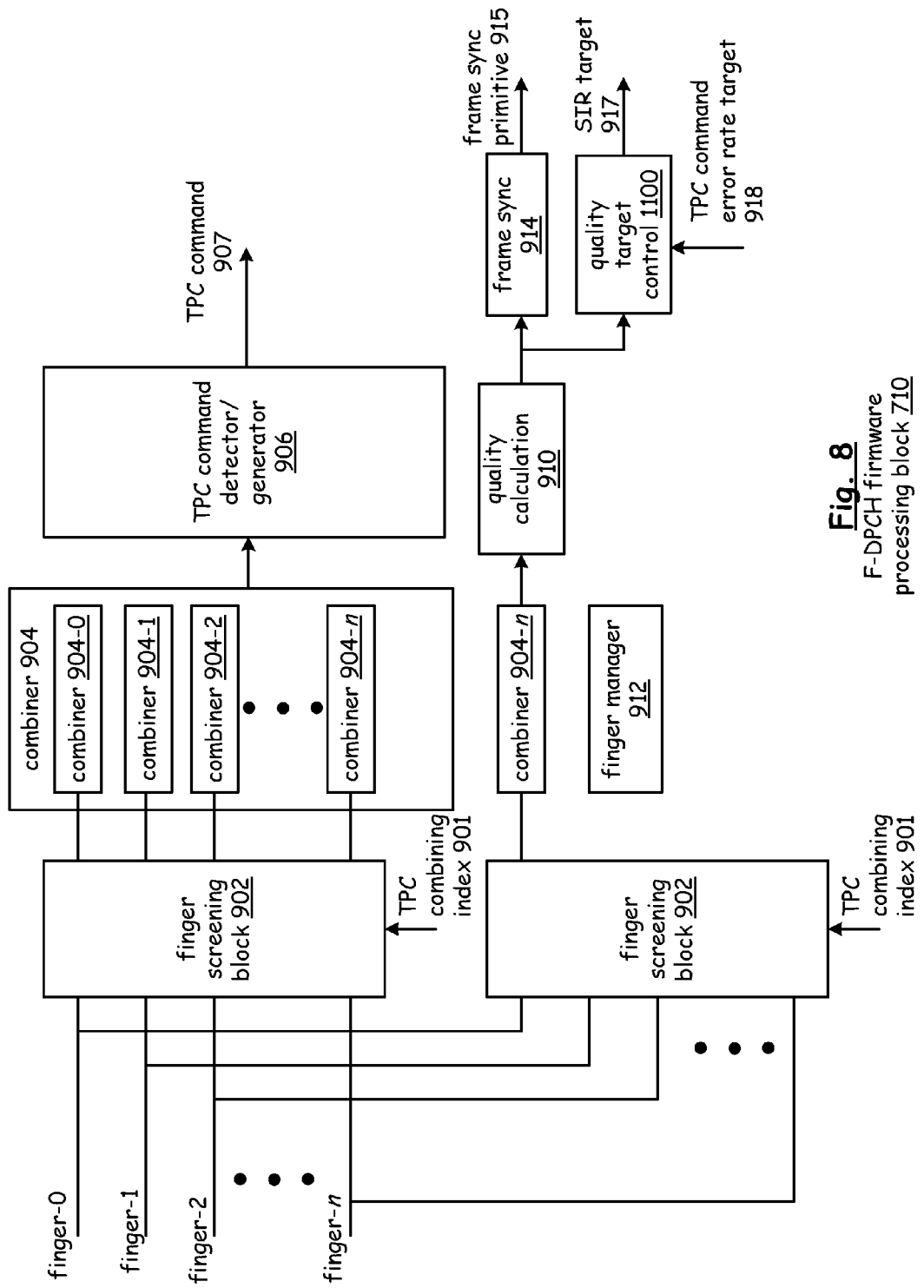
FIG. 8 provides a block diagram of the firmware processing in accordance with embodiments of the present invention.

FIG. 8 provides a block diagram of the firmware processing in accordance with embodiments herein. These firmware algorithms relate to downlink F-DPCH processing provide for Finger combining, frame synchronization, Finger management and downlink quality target. These firmware algorithms relate to downlink F-DPCH processing. Firmware processing may provide the following functions: (1) Finger combining and TPC detection, on the fingers from the serving HS-DSCH cell as well as other cells in soft handover; (2) Frame Synchronization based on the quality estimate from the TPC field from serving HS-DSCH RL; (3) Finger management modifications, may be biased towards serving HS-DSCH cell; and (4) Downlink F-DPCH quality target (that is, command error rate) maintenance, should be maintained on the serving HS-DSCH cell.

Finger combining and TPC detector includes Finger screening blocks 902, combiner blocks 904 and uplink (UL) TPC command detector/generator block 906. First the "Finger screening" block 902 groups the fingers based on a TPC combining index 901. Fingers having the same TPC combining index 901 will be grouped together and routed to the same combiner block 904-1 to 904-n. Since the TPC combining index 901 in one embodiment has a range between 0 and 5, inclusive, a six combiner blocks 904-0, 904-1, 904-2, 904-3, 904-4 and 904-5 would be used. The block diagram of such a combiner 904 is discussed in detail with reference to FIG. 9.

Referring to FIG. 8, the combined TPC soft symbols from all active Recursive Least Squares (RLS) are then provided to the TPC Command Detector/Generator block 906 to generate the TPC command 907, to be applied to effect power control, by way of example, to the uplink DPCCH, e-DPCCH and E-DPDCH channels 403 for communication from the user equipment (UE) 401 to a Node B 402 (see FIG. 4).

One note here for the TPC command generation is those algorithms are originally for the WCDMA DPDCH+DPCCH operations. For HSDPA applications, it may make sense to have the final TPC command biased towards the TPC soft symbols received from the RLS containing the serving HS-DSCH cell. For example, in one extreme, the TPC command detection can use exclusively the TPC soft symbols from the RLS containing the serving HS-DSCH cell. The input from the Quality Calculation block 910 is used for the out-of-synchronization handling and RL initialization. It is updated every slot but should cover measurement window sizes of 40 milliseconds and 160 milliseconds, as required by the 3GPP standards. The calculation can reuse the current algorithms as TPC fields are already used to estimate the DPCCH quality.

Current frame synchronization algorithms can be used for F-DPCH frame synchronization. The difference is that the combined TPC soft symbols now come from fingers due to the RL with the serving HS-DSCH cell.

Finger management algorithms of finger manager 912 for F-DPCH may be fine-tuned and improved based on lab and field testing over dynamically changing test environments and transmit-receive conditions. For single RL scenario (that is, no handoff), finger management operates as in the DPCH case. For single radio link set scenario (DPCH in softer handoff), finger assignment should be biased toward the serving HS-DSCH cell. For multiple radio link sets scenario (DPCH in soft handoff), finger assignment should be biased toward the RLS containing the serving HS-DSCH cell. Within the RLS containing the serving HS-DSCH cell, finger assignment should be biased toward the serving HS-DSCH cell. These Finger management algorithms of finger manager 912 may be implemented by a firmware or hardware implemented Finger Management processing module.

TPC quality calculation 910 is based on the combined output of the TPC soft symbol from the serving HS-DSCH cell (or Node B). Let this combined TPS soft symbol be ($TPC_{i,k}$, $TPC_{q,k}$) for time slot k, the signal power and noise power is then given by:

$$S_k = (TPC_{i,k} + TPC_{q,k})^2$$

$$N_k = (TPC_{i,k} - TPC_{q,k})^2$$

The pair of estimates is the instantaneous signal, $S_k$, and noise power, $N_k$, estimates per slot. They are sent to the Quality target control block 1100 for DL outer-loop power control. For Frame Synchronization 914 and UL power control command generation, quality estimates over 40 ms and 160 milliseconds are needed, a sliding window averaging can be used on the ($S_k$, $N_k$) pair with a total window length of 240 samples. Alternatively, an IIR filter with programmable coefficients may be used to derive comparable metric:

$$S_{40}(k) = \alpha_{40} * S_{40}(k-1) + (1-\alpha_{40}) * S_k$$

$$S_{160}(k) = \alpha_{160} * S_{160}(k-1) + (1-\alpha_{160}) * S_k$$

Where $\alpha_{40} = 59/60$ and $\alpha_{160} = 239/230$ $$S_{160}(k) = \alpha_{160} * S_{160}(k-1) + (1-\alpha_{160}) * S_k$$

Figure 10:
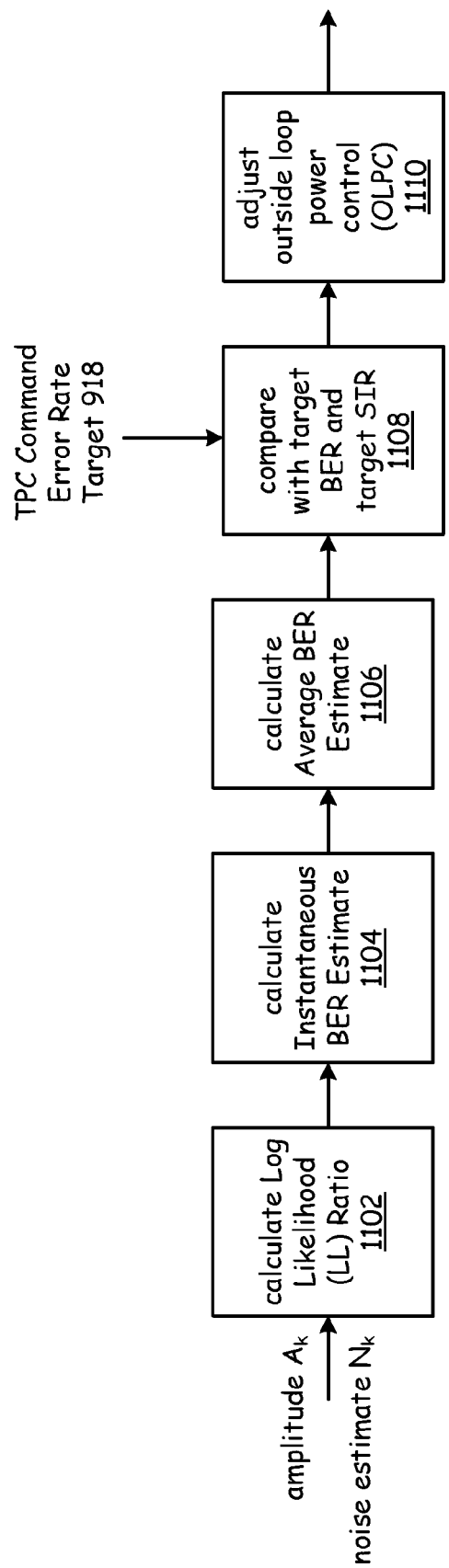
FIG. 10 provides a block diagram of Quality Target Control in accordance with embodiments of the present invention.

F-DPCH quality target control is set as a downlink TPC command error rate target value 918, for the F-DPCH belonging to the radio link from the HS-DSCH serving cell. FIG. 10 provides a block diagram of Quality Target Control 1100 in accordance with embodiments herein. The process regarding determination of quality target control 916 is discussed in detail with regard to FIG. 10.

Figure 9:
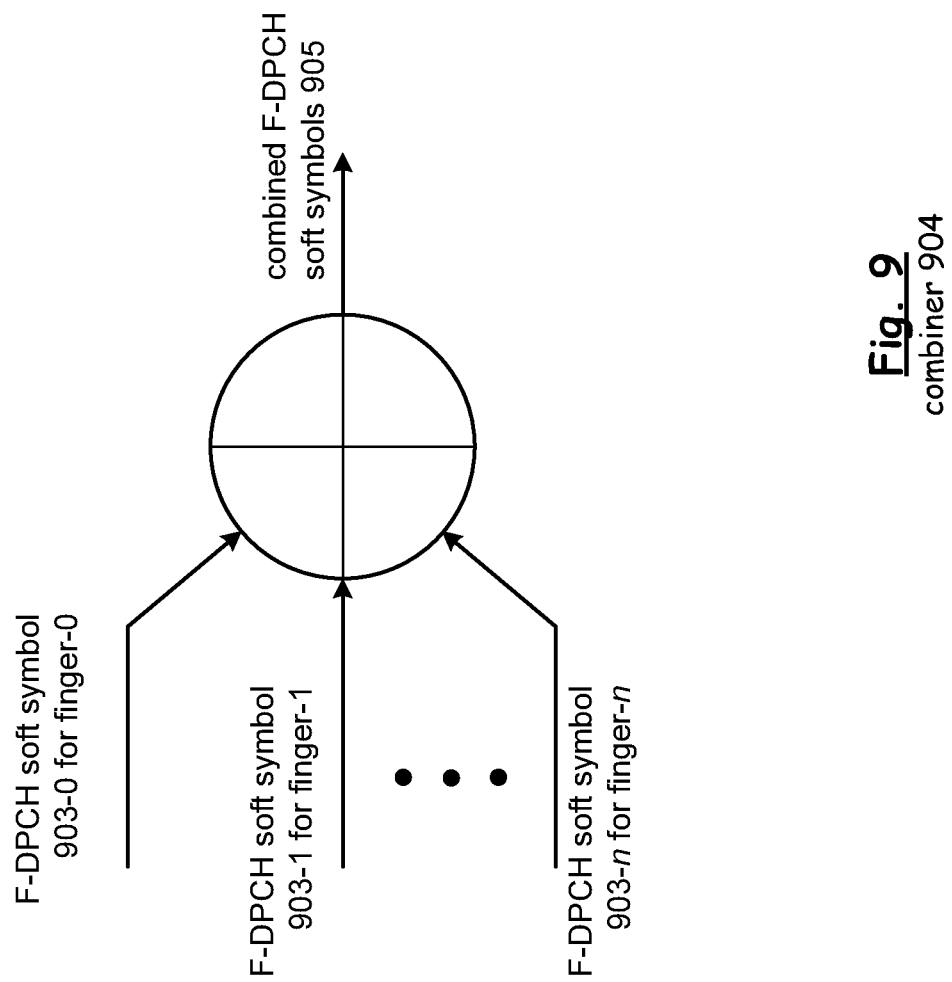
FIG. 9 provides a block diagram of a combiner from FIG. 8 in accordance with embodiments of the present invention.

FIG. 9 depicts a block diagram of a combiner 904 of FIG. 8. The combiner 904 receives soft symbol streams as grouped by finger screening block 902 based upon TPC combining index 901. In the example provides, the combiner 904 receives F-DPCH soft symbol 903-0 for finger-0, F-DPCH soft symbol 903-1 for finger-1, through F-DPCH soft symbol 903-n for finger-n. The combiner combines the soft symbols to produce combined F-DPCH soft symbols 905, which are provided to the TPC Command Detector/Generator block 906 to generate the TPC command 907.

FIG. 10 provides a block diagram of Quality Target Control 1100. The estimates $A_k$ and $N_k$ are received by the quality target control 1100, where $A_k$ is a soft symbol metric amplitude and $N_k$ is a noise estimate. These estimates are used to calculate a log likelihood (LL) ratio in Block 1102. This output is used in Block 1104 to calculate an instantaneous Bit Error Rate (BER) estimate using the log-likelihood ratio calculated from Block 1102. In Block 1106 the average BER estimate is calculated, which then in Block 1108 may be compared with the target BER and target SIR. An adjustment to the SIR target 917 in the outer loop power control (OLPC) may then be provided in Block 1110. The F-DPCH channel contains no dedicated pilot bits, and therefore TPC command error rate has to be estimated from TPC bits, whose transmitted values are unknown to the user equipment receiver. Determining the TPC command error rate estimate has to be accurate in the range BER=[0.01,0.1]. According to 3GPP test requirements, with power control loop enabled, TPC command error rate tolerances are 0.01+/−50% at Ec/Ior=−15.9 dB, and 0.05+/−30% at Ec/Ior=−12 dB.

Another embodiment may involve producing a quality estimate based on: (1) a noise estimation method ($N_k$) wherein I-Q gives a noise sample; (2) a TPC BER calculation method, wherein SNR is calculated and then used to derive instantaneous BER, (3) the instantaneous BER is then averaged to derive the BER, to be compared to an Outer Loop Power Control (OLPC) target; and (4) a look-up table method to calculate the BER to be compared to a OLPC target.

Log-likelihood based computation of the BER is extremely sensitive to preceding viewports. Legacy viewport types (truncation rather than rounding) and legacy gain values contribute to very frequent occurrence of zero-valued inputs, especially for lower SNRs (which correspond to higher error rates). Frequency of the occurrence of zeros is as high as 25%, which can significantly bias the error rate estimation. Zero-valued inputs also create ambiguity in how to compute the reference error rate, which is not clear in the standard either. A simplest possible remedy for this issue is to assign TPC commands randomly to +1 or −1, with equal probability, when input is equal to zero, and account for these when calculating reference error rates. Embodiments may consider replacing legacy viewports with true rounding viewports.

Code may be produced that implements a low complexity firmware implementation. This code is very similar to the present firmware Signal-to-Noise Ratio (SNR) computation code. Definition of the table for mapping log likelihood (LL) values into error rates utilizes mapping from dB values of log likelihood ratio to linear values of error rates, without explicit code-executed conversion from log to linear domain. The exact lookup table values depend on the selected fixed point precision and need to be recalculated if precision is changed. For example, in one embodiment, table elements are 8-bit long (256 elements) and correspond to error range from 0.0 to 0.5. A formula for calculating lookup table values v, which corresponds to the pseudo code with four fractional digits fixed precision specified below is:

$$v = \text{round}[LL/0.5 * 256] \text{ where } LL = \frac{1}{16} * 2^{[\frac{(12aa-12na+7*4)}{16}-7]}$$

Integer values of v are fixed point representation of fractional numbers, where v has 8 bits, and all 8 bits are fractional bits.

In summary, embodiments herein provide a downlink channel receiver operable to implement fractional dedicated physical channel (F-DPCH) processing for HSPDA. The downlink channel receiver includes a receiver, a baseband processing block, a WCDMA processing block, wherein F-DPCH processing is divided between a plurality of hardware processing blocks and a plurality of firmware (FW) processing blocks, and an automatic gain control (AGC) function block. The receiver is operable to convert a radio frequency (RF) signal to a baseband signal. The baseband processing block operable to processes and provides the baseband signal to the WCDMA processing block and the AGC function block. F-DPCH processing is divided between the plurality of hardware processing blocks and plurality of firmware (FW) processing blocks. The AGC function block produces an output that is operable to adjust a variable gain within the receiver.

As one of average skill in the art will appreciate, the term "substantially" or "approximately", as may be used herein, provides an industry-accepted tolerance to its corresponding term. Such an industry-accepted tolerance ranges from less than one percent to twenty percent and corresponds to, but is not limited to, component values, integrated circuit process variations, temperature variations, rise and fall times, and/or thermal noise. As one of average skill in the art will further appreciate, the term "operably coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. As one of average skill in the art will also appreciate, inferred coupling (that is, where one element is coupled to another element by inference) includes direct and indirect coupling between two elements in the same manner as "operably coupled". As one of average skill in the art will further appreciate, the term "compares favorably", as may be used herein, indicates that a comparison between two or more elements, items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method in a wireless mobile device for transmit power control of a fractional dedicated physical channel (F-DPCH) for high-speed data packet access (HSDPA), the method comprising:
   receiving a radio frequency (RF) signal from a serving high speed downlink shared channel (HS-DSCH) via a RAKE receiver structure that includes a plurality of fingers;
   when a channel of the wireless mobile device to a serving high-speed downlink shared channel (HS-DSCH) cell is a legacy WCDMA dedicated physical channel:
      processing the RF signal to produce a plurality of soft symbols;
      detecting whether transmit power control (TPC) command bits are present in the plurality of soft symbols via non-dedicated pilot bits of the RF signal;
      when the TPC command bits are detected, processing the plurality of soft symbols to produce estimated TPC command bits to be applied to the channel based on the legacy WCDMA dedicated physical channel by:
         producing a finger grouping from the plurality of fingers of the RAKE receiver structure based on a TPC combining index to generate a set of soft symbols; and
         generating the estimated TPC command bits based on the set of soft symbols;
         generating a TPC quality estimate based on the estimated TPC command bits; and
         adjusting a signal-to-interference ratio for the WCDMA dedicated physical channel based upon a comparison of the TPC quality estimate with a TPC quality target to effect F-DPCH power control.

2. The method of claim 1, wherein the processing the plurality of soft symbol to produce the estimated TPC command bits further comprising:
   producing, based on the TPC quality estimate, a signal-to-interference ratio target for outer loop power control.

3. The method of claim 2, wherein the TPC quality estimate comprises at least one of:
   a noise estimation estimate of the RF signal;
   a TPC bit error rate based upon a signal-to-noise ratio to derive an instantaneous bit error rate for comparison with an outer loop power control target; and
   a look-up table determination to determine the bit error rate to be compared with the outer loop power control target.

4. The method of claim 1 further comprising:
   when a diversity indicator is present with the RF signal, performing Space-Time Transmit Diversity (STTD) decoding of the RF signal that includes summing a channel estimate for at least two antennas to derotate a despread F-DPCH symbol.

5. A method in a wireless mobile device for fractional dedicated physical channel (F-DPCH) processing for high-speed data packet access (HSDPA), the method comprising:
   when an uplink channel of the mobile device to a serving high-speed downlink shared channel (HS-DSCH) cell is a legacy WCDMA dedicated physical channel, receiving a processed baseband signal based upon a radio frequency (RF) signal from the serving HS-DSCH cell via a RAKE receiver structure that includes a plurality of fingers;
   processing the processed baseband signal to produce a set of soft symbol outputs;
   detecting, by the wireless mobile device, whether transmit power control (TPC) command bits are present in the set of soft symbol outputs, wherein the TPC command bits are conveyed over non-dedicated pilot bits of the processed baseband signal;
   when the TPC command bits are detected,
      processing the set of soft symbol outputs to produce estimated TPC command bits to be applied to an uplink channel based on the legacy WCDMA dedicated physical channel by:
         producing a finger grouping from the plurality of fingers of the RAKE receiver structure based on a TPC combining index to generate a set of soft symbols; and
         generating the estimated TPC command bits based on the set of soft symbols; and
      generating a TPC quality estimate based on the estimated TPC command bits; and
      adjusting a signal-to-interference ratio for the WCDMA dedicated physical channel based upon a comparison of the TPC quality estimate with a TPC quality target to effect F-DPCH power control.

6. The method of claim 5, wherein the processing the set of soft symbol outputs to produce the estimated TPC command bits further comprising:
   producing, based on the TPC quality estimate, a signal-to-interference ratio target for outer loop power control.

7. The method of claim 6, wherein the TPC quality estimate comprises at least one of:
   a noise estimation estimate of the processed baseband signal;
   a TPC bit error rate based upon a signal-to-noise ratio to derive an instantaneous bit error rate for comparison with an outer loop power control target; and
   a look-up table determination to determine the bit error rate to be compared with the outer loop power control target.

8. The method of claim 5 further comprising:
   when the processed baseband signal includes a diversity indicator, performing Space-Time Transmit Diversity (STTD) decoding of the processed baneband signal that includes summing a channel estimate from at least two antennas for derotating a despread F-DPCH symbol.

9. The method of claim 5 further comprising:
when a diversity indicator is present with the received processed baseband signal, performing Space-Time Transmit Diversity (STTD) decoding of the processed baseband signal to derotate a despread F-DPCH symbol.

10. A method in a wireless mobile receiver for fractional dedicated physical channel (F-DPCH) processing for high-speed data packet access (HSDPA) via a high-speed downlink shared channel (HS-DSCH) cell, the method comprising:
producing a set of soft transmit power control (TPC) symbol outputs for at least two multipaths from a received baseband signal via fingers of a RAKE receiver structure, wherein the received baseband signal is converted from a radio frequency (RF) signal, the received baseband signal lacking known pilot bit locations for TPC command bits;
combining the set of soft TPC symbol outputs to produce combined TPC soft symbols;
generating a TPC quality estimate based upon a selected sample window of the combined TPC soft symbols, wherein the TPC quality estimate is based on a signal component estimate and a noise power component estimate;
generating a downlink TPC command based upon a comparison of the TPC quality estimate and a signal-to-interference ratio target for the F-DPCH; and
adjusting the signal-to-interference ratio target for the F-DPCH based on the downlink TPC command to effect F-DPCH power control.

11. The method of claim 10, wherein the TPC quality estimate comprises a log likelihood ratio computation the selected sample window of the combined TPC soft symbols.

12. The method of claim 10, wherein the TPC quality estimate comprises an averaged bit error rate.

13. The method of claim 10 wherein the downlink TPC command effects the F-DPCH power control for at least one of:
a Dedicated Physical Control CHannel (DPCCH);
an Enhanced-DPCCH (E-DPCCH); and
an Enhanced-Dedicated Physical Data CHannel (E-DPDCH).

14. The method of claim 10 further comprising:
producing, based on the TPC quality estimate, a signal-to-interference ratio target for outer loop power control of the F-DPCH.

15. The method of claim 10, wherein the TPC quality estimate comprises:
a noise estimation estimate of the received baseband signal.

16. The method of claim 10, wherein the TPC quality estimate comprises:
a TPC bit error rate based upon a signal-to-noise ratio to derive an instantaneous bit error rate for comparison with an outer loop power control target.

17. The method of claim 10, wherein the TPC quality estimate comprises:
a look-up table determination to determine the bit error rate to be compared with an outer loop power control target.

18. The method of claim 10 further comprising:
when a diversity indicator is present with the received RF signal, performing Space-Time Transmit Diversity (STTD) decoding of the received RF signal that includes summing a channel estimate for at least two antennas to derotate a despread F-DPCH symbol.

19. The method of claim 1, wherein the TPC quality estimate comprises at least one of:
a noise estimation estimate of the RF signal;
a TPC bit error rate based upon a signal-to-noise ratio to derive an instantaneous bit error rate for comparison with an outer loop power control target; and
a look-up table determination to determine the bit error rate to be compared with the outer loop power control target.

20. The method of claim 5, wherein the TPC quality estimate comprises at least one of:
a noise estimation estimate of the processed baseband signal;
a TPC bit error rate based upon a signal-to-noise ratio to derive an instantaneous bit error rate for comparison with an outer loop power control target; and
a look-up table determination to determine the bit error rate to be compared with the outer loop power control target.

* * * * *